United States Patent Office 3,525,641
Patented Aug. 25, 1970

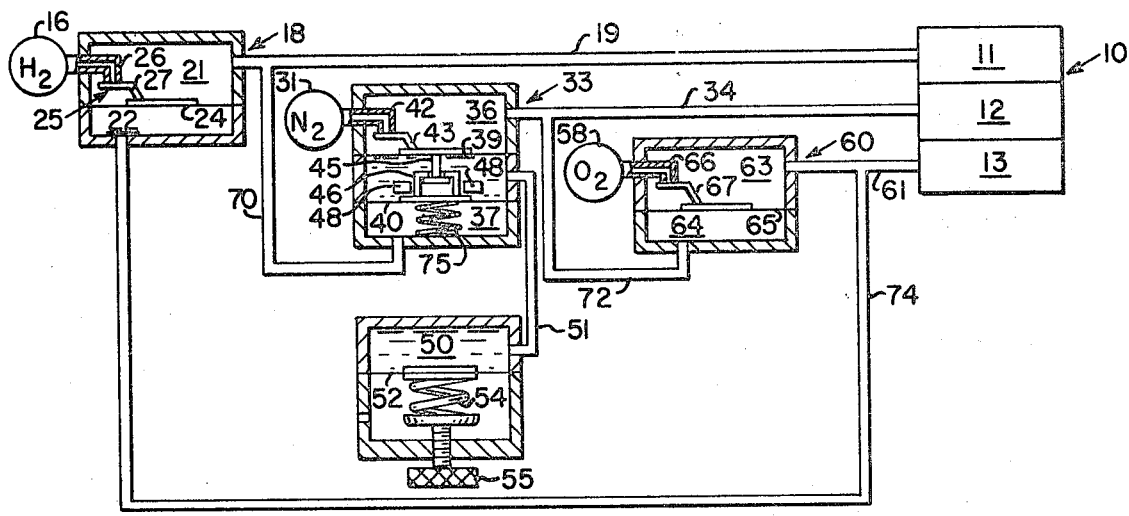
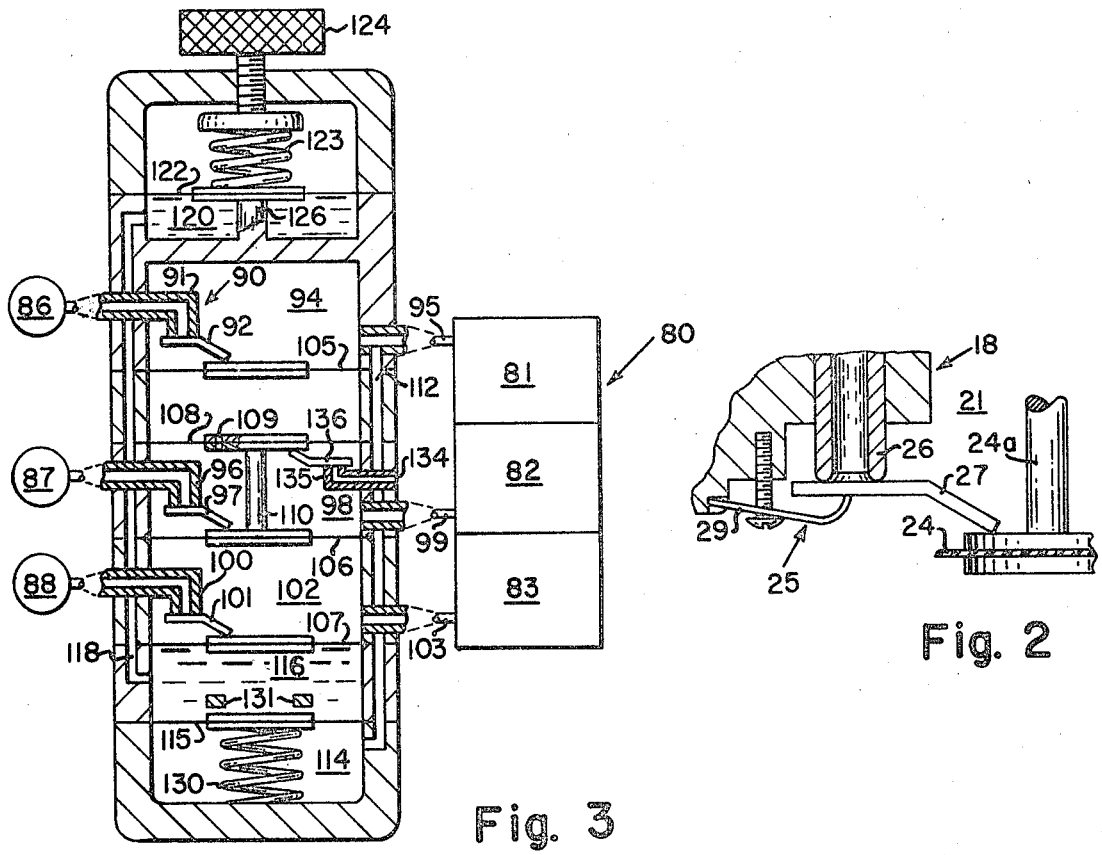

3,525,641
FUEL CELL CONTROL
Joseph O. Thorsheim, Minneapolis, Minn., assignor to Honeywell Inc., Minneapolis, Minn., a corporation of Delaware
Filed Dec. 29, 1965, Ser. No. 527,406
Int. Cl. H01m 27/02
U.S. Cl. 136—86      2 Claims

ABSTRACT OF THE DISCLOSURE

A fuel cell control system in which the pressures in the two reactant sections and the electrolyte section are controlled by pressure regulators which are interconnected so that none of the regulated pressures can exceed the lowest of the supply pressures.

---

The present invention is directed to a fuel cell control system in which the pressures in the pressurized sections of the cell are controlled in a manner to prevent dangerous differences in pressure within the cell as well as to maintain desired absolute pressure.

As fuel cells are currently designed each of the reactants, commonly hydrogen and oxygen, are separated from the electrolyte by porous electrodes or ion exchange membranes that have low mechanical strength. It is essential, therefore, that the differential pressure across the electrodes never exceed a safe value during start up, while running, and during shutdown. Arrangements such as shown in U.S. Pat. No. 3,364,070 have been proposed that relate all pressures to one of the pressures which can be considered a master control pressure. The difficulty with such a system, however, is that if one of the other pressure sources is non-existent or inadequate, or is lost, the other pressures in the cell will not respond to the condition and a hazardous condition will be created. It has been proposed previously by applicant in his U.S. Pat. No. 3,106,494 to regulate the pressures of oxygen and hydrogen supplied to a fuel cell so that neither pressure can exceed the lowest of the two pressures.

According to the present invention the pressurizing gas for an electrolyte is controlled together with the two reactants so that none of them can ever have a pressure greater by a dangerous amount than any of the others. The arrangement is such that if there is a failure of any pressure, all gas supplies will be shut off. Likewise, on start up, the several gas supplies may be turned on in any order, and pressure will not build up within any of the sections of the fuel cell until all supplies are available. Further, the pressures will build up simultaneously and will be substantially equal at any instant.

An arrangement is also provided to establish the absolute pressure maintained within the fuel cell under running condition. The regulating device for one of the fuel cell sections is provided with a maximum pressure limiting structure so arranged that the regulating valve is controlled by the lesser of two forces, one being a force produced in another of the fuel cell sections, and the other being a force produced by an adjustable pressure regulating spring or other adjustable force producing means. An advantage of this arrangement over the provision of a separate regulator in one of the supply lines is that accuracy of pressure regulation is not degraded by having two valves in series both attempting to maintain the same pressure.

In the drawing: FIG. 1 is a fuel cell control system in which each of the regulating devices is self-contained; FIG. 2 is a fragmentary detail of the valves employed in FIGS. 1 and 3; FIG. 3 is a control system in which the regulators for all the fluid pressures are combined in a unitary structure.

In the fuel cell control system shown diagrammatically in FIG. 1, a fuel cell 10 has a first reactant section 11, an electrolyte section 12, and a second reactant section 13. It will be understood that fuel cell section 11 is separated from section 12 by a porous electrode that permits contact between the reactant, which may be hydrogen, and the electrolyte. Likewise, the electrolyte section 12 is separated from section 13 by a porous electrode that permits contact between the electrolyte and the second reactant, which may be oxygen.

A fluid reactant source 16 is connected to fuel cell section 11 through a pressure regulating device 18 and a fluid connecting line 19. This fluid reactant may be hydrogen gas. The device 18 comprises two chambers 21 and 22 separated by a movable wall in the form of a diaphragm 24. An inlet valve 25 in chamber 21 consists of a nozzle 26 and a flapper 27 which engages the diaphragm 24.

FIG. 2 shows a typical valve in somewhat more detail than in the diagrammatic showing of FIG. 1. The flapper 27 is normally held flat against the end of nozzle 26 by a light leaf spring 29. Should the diaphragm 24 move upwardly, as would result if pressure in chamber 21 were reduced below the pressure in chamber 22, the flapper 27 will be tilted about an edge of the nozzle 26 to open the valve and admit fluid to chamber 21. The diaphragm 24 is here shown as having a post 24a, which in actual construction, would be connected to guide means to assure rectilinear motion of the diaphragms. The guide means may be another diaphragm whose function is to act as a guide.

A second fluid pressure source 31 is connected to fuel cell section 12 through a regulating device 33 and a fluid connecting line 34. This fluid may be nitrogen which serves to pressurize the electrolyte. The device 33 comprises two chambers 36 and 37 separated by a movable wall in the form of two spaced diaphragms 39 and 40. The inlet valve for chamber 36 consists of a nozzle 42 and a flapper 43 which engages diaphragm 39, as described in connection with regulating device 18. The diaphragms 39 and 40 are provided with cooperating abutments in the form of "hooks" 45 and 46 that engage to limit separation of the two diaphragms. Stops 48 are located to engage diaphragm 40 to stop its upward movement as will be described below.

The space between diaphragms 39 and 40 is filled with a transmitting liquid and is connected to a liquid filled chamber 50 by a line 51. A diaphragm 52 forms one side of chamber 50 and maintains a pressure in the liquid determined by the force of a spring 54, the loading of which is determined by an adjusting screw 55. In the illustrated position of the parts of regulating device 33 the spring is ineffective in determining the position of diaphragm 39 since the hooks 45 and 46 are in engagement and diaphragms 39 and 40 will move as a unit to open the flapper 43 if there is relative reduction in pressure in chamber 36. The hooks 45 and 46 are merely forced into engagement by the pressure between the diaphragms.

A third fluid pressure source 58 is connected to fuel cell section 13 through a regulating device 60 and a fluid connecting line 61. This fluid may be oxygen, the second reactant. The device 60 comprises two chambers 63 and 64 separated by a diaphragm 65. The inlet valve for chamber 63 consists of a nozzle 66 and a flapper 67, which engages diaphragm 65 and operates in the same manner as the valve described for regulating device 18.

The controlling force for each of the pressure regulating devices 18, 33 and 60 is provided by the regulated pressure of another one of the regulating devices. A fluid connecting line 70 connects the first chamber 21 of regulating device 18 and the second chamber 37 of regulating device 33. A fluid connecting line 72 connects the first chamber 36 of device 33 and the second chamber 64 of device 60, and a line 74 connects the first chamber 63 of regulating device 60 and the second chamber 22 of regulating device 18.

With no pressure supplied from any of the sources all of the valves will be closed. To permit start up of the system a light spring 75 acts on the diaphragm 40 tending to open the flapper 43. Spring 75 could be placed in any one of the regulators. On start up, when only two of the pressure sources are established there will be no outlet pressure build up, even though one of the regulators includes the starting spring 75 as slight pressure will close the associated valve. When the final pressure source is available, pressure in the whole system will build up cumulatively but equally. Thus, as pressure builds up in chamber 21 it is transmitted to chamber 37 which is balanced only by opening of flapper 43 to admit more pressre to chambers 36 and 64. Additional pressure cannot be built up in chamber 21 until the pressure in chamber 63 balances that in chamber 64 to raise the pressure in chamber 22. This arrangement provides safe start up as it is impossible to supply excessive pressure to any of the fuel cell sections.

The system operation as so far described would be a runaway system, limited only by the original supply pressures. To control the absolute pressures supplied to the fuel cell sections a pressure limiting arrangement is provided in one of the pressure regulating devices. As described previously, the regulating device 33 has a movable wall consisting of two spaced diaphragms 39 and 40 with the space therebetween filled with liquid. So long as the pressures in chambers 36 and 37 is less than the liquid pressure, the hooks 45 and 46 lock the two diaphragms to move as a unit. However, if the pressure in chambers 36 and 37 exceeds the liquid pressure, some liquid will flow to the adjusting chamber 50 and the lower diaphragm 40 will engage the stops 48. Under this condition the pressure in chamber 37 no longer has any influence on diaphragm 39 and the pressure in chamber 36 will be regulated by the spring 54 which determines the liquid pressure under diaphragm 39. If any of the supply pressures are reduced to a value below the selected absolute control pressure, that reduction will immediately be felt around the system to reduce the other pressures accordingly.

Another arrangement of the same basic control system is shown in FIG. 3. Here the several pressure regulating devices as well as the absolute pressure adjusting mechanism are arranged in stacked relation and provide a unitary structure. A fuel cell 80 has pressurized sections 81, 82 and 83 that are supplied with fluid from pressure sources 86, 87 and 88 respectively. Fluid from pressure source 86 passes through a valve 90 consisting of a nozzle 91 and a flapper 92 to a chamber 94 and thence through a pressure line 95 to the fuel cell section 81. Fluid from pressure source 87 passes through a valve consisting of a nozzle 96 and a flapper 97 to a chamber 98 and thence through a fluid pressure line 99 to fuel cell section 82. Likewise, fluid from pressure source 88 passes through a valve consisting of a nozzle 100 and a flapper 101 to a chamber 102 and through a fluid pressure line 103 to fuel cell section 83.

Flappers 92, 97 and 101 are actuated by diaphragms 105, 106 and 107 respectively. A diaphragm 108 having an opening 109 therethrough is connected by a post 110 to the diaphragm 106. Since the diaphragm 108 is vented to the chamber 98 the pressure of chamber 98 is also applied to the lower side of diaphragm 105. The pressure in chamber 102 above diaphragm 107 is also applied to the lower side of diaphragm 106. It will be seen that whereas in the system described in FIG. 1, certain of the pressure transmitting lines extended exteriorly of and between the pressure regulating devices, in the present embodiment the pressure connection consists merely in the physical location of the controlling diaphragms in different parts of the same chamber.

Chamber 94 above the diaphragm 105 is connected by a connecting passage 112 through the housing of the structure to a chamber 114 beneath a diaphragm 115. The space between diaphragms 107 and 115 is filled with a motion transmitting liquid in a chamber 116 which is connected through a passage 118 to a chamber 120 at the top of the structure. A diaphragm 122 closes the top portion of the chamber 120 and a spring 123 whose force is adjusted by a screw 124 normally biases the diaphragm 122 against a stop 126. Under this condition the amount of liquid in the chamber 116 is fixed and diaphragms 107 and 115 will move together. In this condition of the device the pressure supplied to each of the fuel cell sections will always be equal and the value will be that of the lowest pressure supplied to the system. As explained in connection with FIG. 1, a light starting spring 130 biases the diaphragm 107 upwardly with enough force to open the associated valve under starting conditions.

Absolute pressure under running conditions is established by the setting of the spring 123 since a pressure in the chamber 114 greater than the pressure determined by the spring 123 will result in liquid leaving the chamber 116, moving diaphragm 122 away from stop 126 and bringing the diaphragm 115 into engagement with stops 131. Under this condition a buildup of pressure in the chamber 102 will move the diaphragm 107 downwardly to close the flapper 101 against the pressure established in the chambers 120 and 116 by the spring 123.

Any of the pressure regulating chambers may be provided with an exhaust valve as well as the described inlet valve. Here the chamber 98 is shown having a relief valve. Exhaust port 134 has a nozzle 135 normally closed by a flapper 136 which may be actuated by the diaphragm 108. The function of the exhaust valve is to maintain the pressure within the chamber 98 in case there is no demand for the fluid in the fuel cell section 82 and the pressure in the chamber 102 acting on diaphragm 106 calls for a reduction in pressure in the chamber 98.

It will be understood in both of the described embodiments of the invention that a reduction in pressure in any of the sections of the fuel cell will immediately cause a corresponding reduction in the other sections. In FIG. 1, if for any reason the pressure in section 11 should fall, this reduced pressure will be transmitted through fluid connecting line 70 to chamber 37 of regulating device 33. If this pressure is less than the adjusted liquid pressure between diaphragms 39 and 40, the diaphragm 39 will move downwardly to close the flapper 43 on nozzle 42 to cut off the supply of nitrogen until the pressure in chamber 36 is substantially the same as in chamber 37. This reduced pressure will be transmitted through connecting line 72 to chamber 64 of pressure regulating device 60 to cause a corresponding reduction in chamber 63. Thus, the pressure in chamber 36 is changed to bring the pressure in fuel cell section 12 into agreement with that in section 11, and the pressure in chamber 63 is changed to bring the pressure in fuel cell section 13 into agreement with the pressures in sections 11 and 12. It will be seen that a reduction in pressure at any point is reflected around the system to bring all pressures to a new level.

I claim:

1. Apparatus for controlling the pressure of a plurality of fluid supplies comprising a plurality of pressure operated valve means with one valve means being for each fluid supply to be controlled; each of said valve means including first and second chambers separated by pressure responsive means movable in response to difference in pressure between said chambers, the first of said chambers of each of said valve means including an inlet connection and an outlet connection, a valve controlling each of said inlet connections and arranged to be operated by the pressure responsive means for that valve means in an opening direction upon a reduction of pressure in the first chamber relative to the pressure in the second chamber, a fluid connection between the first chamber of one of said pressure operated valve means and the said second chamber of second one of said valve means, a fluid connection between the first chamber of said second one of said valve means and the second chamber of another of said valve means, the pressure responsive means of one of said pressure responsive valve means consisting of two movable walls with a motion transmitting liquid therebetween, a pressure relief chamber arranged to receive transmitting liquid when the pressure exceeds a predetermined value, and stop means arranged to limit movement of the movable wall associated with the second chamber of said valve means in the valve opening direction.

2. Apparatus for controlling the pressure of a plurality of fluid supplies comprising a series of more than two pressure operated valve means with one of said valve means being for each fluid supply to be controlled; each of said valve means including first and second chambers, each of said valve means including a pressure responsive means movable in response to the difference in pressure between said chambers, the first of said chambers of each of said valve means including an outlet connection and an inlet connection, a valve controlling each of said inlet connections and arranged to be operated by the pressure responsive means for that valve means in an opening direction upon a reduction of pressure in the first chamber relative to the pressure in the second chamber, means for subjecting the second chamber of an intermediate valve means in the series to the pressure in the first chamber of the first valve means in the series, means for subjecting the second chamber of the final valve means in the series to the pressure in the first chamber of said intermediate valve means, means for subjecting the second chamber of the first valve means in the series to the pressure in the first chamber of the final valve means in the series, the pressure responsive means separating the first and second chambers of one of said pressure operated valve means consisting of two spaced diaphragms with the space filled with liquid, means maintaining a predetermined pressure in said liquid, and means for preventing the volume of liquid from exceeding a predetermined value.

References Cited

UNITED STATES PATENTS 3,106,494  10/1963  Thorsheim _____ 136—86
3,364,070  1/1968  Alexander _____ 136—86

ALLEN B. CURTIS, Primary Examiner

U.S. Cl. X.R.

137—98